J. E. Seavey,
Clasp,
N° 47,366    Patented Apr. 18, 1865.

Witnesses
F. R. Hale Jr
H. O. Fisher

Inventor
John E. Seavey
by his Attorney
R. H. Eddy

UNITED STATES PATENT OFFICE.

JOHN E. SEAVEY, OF KENNEBUNKPORT, MAINE, ASSIGNOR TO HIMSELF AND EDWARD S. HUTCHINS.

IMPROVED TRACE-CONNECTION.

Specification forming part of Letters Patent No. 47,366, dated April 18, 1865.

*To all whom it may concern:*

Be it known that I, JOHN E. SEAVEY, of Kennebunkport, in the county of York and State of Maine, have invented a new and useful Breeching or Trace-Connection; and I do hereby declare the same to be fully described in the following specification and represented in the accompanying drawings, of which—

Figure 1:
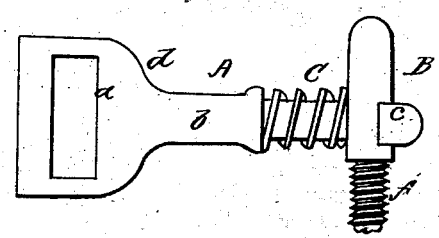
Figure 3:
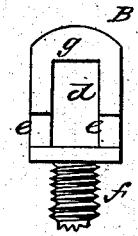
Figure 2:
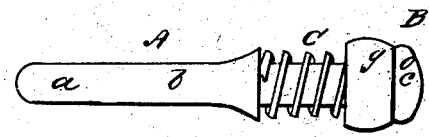
Figure 4:
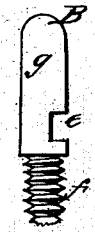

Figure 1 is a side elevation of it. Fig. 2 is a top view of the part to which the breeching or trace is immediately connected when the invention is in use. Fig. 3 is a front view, and Fig. 4, a side elevation, of the notched eye or other portion of the invention.

In the drawings, A and B are the two principal parts forming the connection. The part A is composed of an eye, $a$, and a shank, $b$, provided with a head, $c$, the whole being formed and arranged as shown in Figs. 1 and 2, there being a shoulder, $d$, at the juncture of the shank and eye. A helical spring, C, envelopes the shank $b$.

The head $g$ of the part B is formed with a vertical eye or passage, $d$, extending through it and opening into a locking-notch, $e$, made transversely across the head. A screw, $f$, projects downward from the head, and with such head completes the part B. The said screw is intended to enter the thill or shaft and hold the part B thereto, when the connection is applied to the shaft of a vehicle. So, when the invention is employed as a means of connecting a trace to a whiffletree, the part A is to be fastened to one end of the trace, while the screw $f$ is to enter the whiffletree.

By pressing the head $c$ of the shank $b$ through the passage $d$ and turning the head ninety degrees the spring will draw it into the notch $e$ and hold the two parts A and B in connection.

The mode of disengaging the said two parts will be apparent.

I claim as my invention—

The breeching or trace-connection, as composed of the eye $a$, the shank $b$, the head $c$, the spring C, the head $g'$, the passage $d$, the notch $e$, and the screw $f$, (or the equivalent of the latter,) the whole being arranged substantially as and so as to operate as specified.

JOHN E. SEAVEY.

Witnesses:
R. H. EDDY,
F. P. HALE, Jr.